United States Patent
Reyes et al.

(10) Patent No.: US 12,548,347 B1
(45) Date of Patent: Feb. 10, 2026

(54) USER-DEFINED DISPLAY OF DETECTED OBJECTS IN A VEHICULAR RADAR SYSTEM

(71) Applicant: Pro-Vision Spartan Radar, LLC, Byron Center, MI (US)

(72) Inventors: Neil Mathew Reyes, Laguna Hills, CA (US); Arindam Sengupta, Huntington Beach, CA (US); Ismael Garcia, Long Beach, CA (US); Ryan Song, Redondo Beach, CA (US); Amanda Gatz, Huntington Beach, CA (US)

(73) Assignee: Pro-Vision Spartan Radar, LLC, Byron Center, MI (US)

( * ) Notice: Subject to any disclaimer, the term of this patent is extended or adjusted under 35 U.S.C. 154(b) by 320 days.

(21) Appl. No.: 18/322,773

(22) Filed: May 24, 2023

(51) Int. Cl.
*G06V 20/58* (2022.01)
*B60W 30/08* (2012.01)

(52) U.S. Cl.
CPC ............. *G06V 20/58* (2022.01); *B60W 30/08* (2013.01); *B60W 2420/408* (2024.01); *B60W 2554/4049* (2020.02)

(58) Field of Classification Search
None
See application file for complete search history.

(56) References Cited

U.S. PATENT DOCUMENTS

| | | | |
|---|---|---|---|
| 11,231,481 B1* | 1/2022 | Cohen | G01S 7/2927 |
| 2017/0371348 A1* | 12/2017 | Mou | G05D 1/0257 |
| 2019/0346854 A1* | 11/2019 | Slutsky | G01S 13/878 |
| 2019/0353778 A1* | 11/2019 | Slutsky | G01S 7/285 |
| 2020/0158820 A1* | 5/2020 | Ikram | G01S 13/06 |
| 2020/0326721 A1* | 10/2020 | Buerkle | G06T 7/0002 |
| 2020/0380274 A1* | 12/2020 | Shin | G06T 1/20 |
| 2021/0255307 A1* | 8/2021 | Bongio Karrman | G01S 13/589 |
| 2021/0341603 A1* | 11/2021 | Park | G06N 3/04 |
| 2022/0153276 A1* | 5/2022 | Steyer | G06T 7/62 |
| 2022/0215673 A1* | 7/2022 | Fujiwara | G06V 20/58 |
| 2023/0213664 A1* | 7/2023 | Kulkarni | G01S 13/865 342/357.31 |
| 2024/0262386 A1* | 8/2024 | Kar | B60W 60/0011 |
| 2024/0336138 A1* | 10/2024 | Meissner | B60K 35/22 |

* cited by examiner

*Primary Examiner* — Soo Shin
(74) *Attorney, Agent, or Firm* — NIXON PEABODY, LLP (57) ABSTRACT

Systems and methods are provided that enable a user to define a reportable region of a radar sensor for a vehicle such that an operator of the vehicle can receive information on objects that are located within the defined region. In addition, the user can also define how the system provides the information to the operator of the vehicle. The user can define the number of cells in the region based on the user's selection of a desired number of down range zones and a desired number of cross range segments. If an object is detected in the defined region, a display visible by the operator of the vehicle can display the cells of the defined region and indicate the cell(s) that corresponds to the location of a detected object.

20 Claims, 7 Drawing Sheets

USER-DEFINED DISPLAY OF DETECTED OBJECTS IN A VEHICULAR RADAR SYSTEM

BACKGROUND

The present application generally relates to radar systems. More specifically, the present application is directed to systems and methods for a user to define when the driver or operator of a vehicle is provided with information about detected objects (or tracks) in the environment.

Previously, vehicles have used ultrasonic systems to detect objects in the vicinity of the vehicle. However, there are several drawbacks to using ultrasonic systems to detect objects. One problem with ultrasonic systems is that they are not able to withstand harsh conditions, thereby limiting the usefulness of the detection system. Another issue with ultrasonic systems is that multiple ultrasonic sensors may be needed to cover a wider area of the vehicle.

SUMMARY

The present application is directed to systems and methods of a vehicular radar system that permit a user to define a region of the field of view for a radar sensor of the vehicular radar system to provide information to the driver or operator of the vehicle regarding objects that are located within the defined region. The user can also define how the system provides the information to the driver or operator of the vehicle. The user can define the number of cells in the region based on the user's selection of a desired number of down range zones and the selection of a desired number of cross range segments. If the system determines that an object is located in the defined region, the system can display the defined region and indicate the cell(s) in the defined region that correspond to the location of a detected object.

The present application uses a single radar sensor to determine the location of objects in the environment, either in polar coordinates (e.g., range and angle) or in Cartesian coordinates (e.g., x, y and z), and can provide zone (down range, viz. y) and segment (cross range, viz. x) information to the user (on a display) based on the information from the single radar sensor. In addition, the single radar sensor can determine the relative velocity (i.e., a velocity relative to the sensor or vehicle) of the objects in the environment. The user can select the number of zones and the number of segments that are to be included in the display of information to the driver or operator of the vehicle. In addition, the user can exclude areas that may be in the field of view of the sensor but not of interest to the driver or operator of the vehicle. For example, the user may exclude an area near the sensor (an offset area or region) that may include portions of the vehicle that are detectable by the radar sensor and/or areas far away from the sensor such that objects detected outside the defined region are of low value to the driver or operator of the vehicle. In an embodiment, the sensor can exclude portions of the vehicle that are in or near the offset area by excluding those objects with the 0 m/s relative velocity. By using the relative velocity of objects, the sensor can distinguish between a portion of the vehicle (which moves at the same velocity as the sensor) and an independent object that does not move at the same velocity as the sensor such as a person entering the offset area, or a bollard located in the offset area. In another embodiment, the user can be provided with an option to display one or both of static (zero relative velocity) and moving (non-zero relative velocity) objects detected in the offset area.

One advantage of the present application is that the user can define an area of interest regarding objects detected by the vehicular radar system such that the driver or operator of the vehicle is only alerted when a detected object is in the area of interest.

Another advantage of the present application is that the user can customize the displaying of information about objects detected by the vehicular radar system in the user's defined area of interest.

Still another advantage of the present application is the ability of an operator of the vehicle to visually follow movement of an object through the area of interest.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
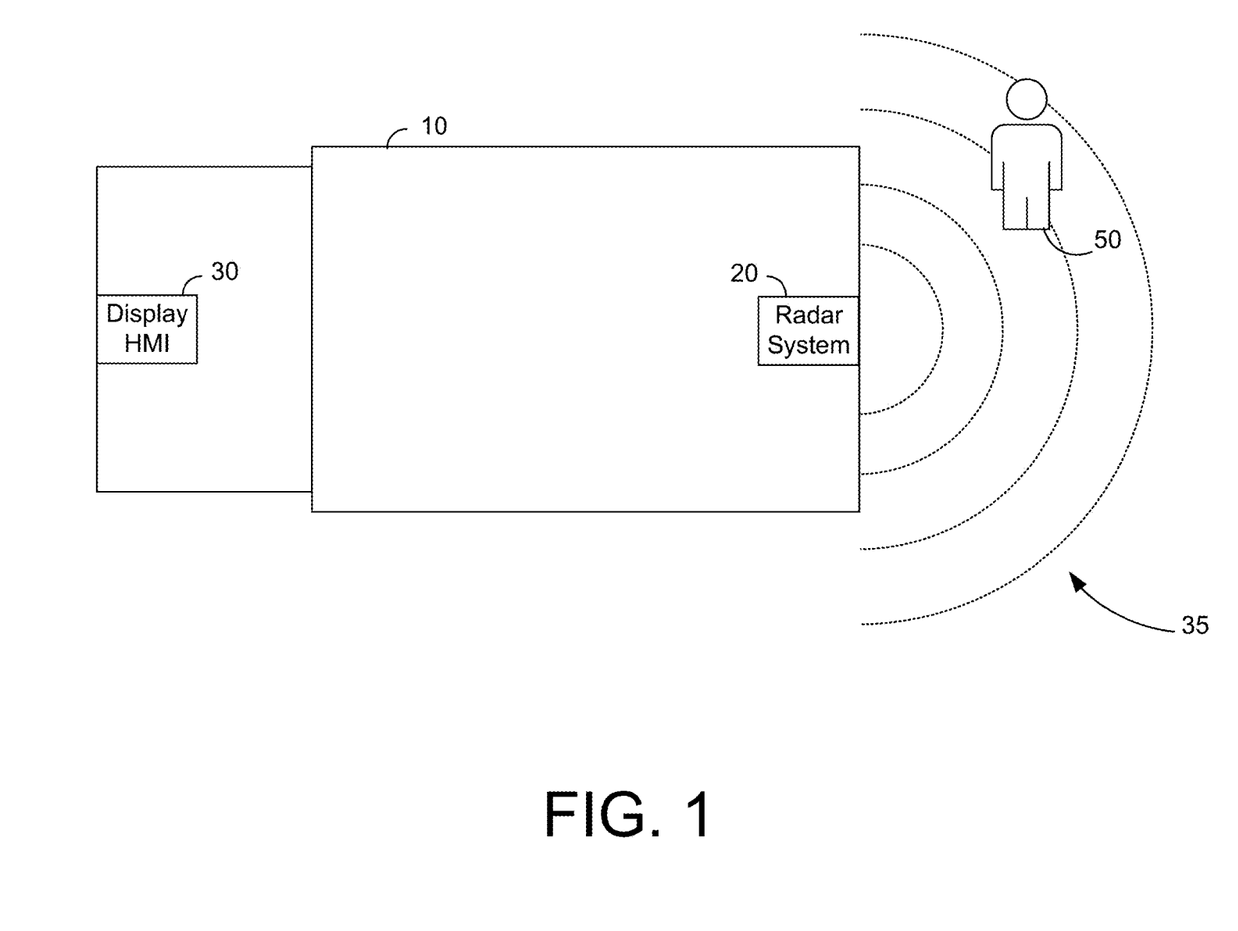
FIG. 1 is a schematic diagram showing a vehicle with a radar system in use in the environment.

FIG. 1 shows an embodiment of a vehicle 10 in use in the environment. The vehicle 10 can be equipped with a radar system 20 to detect objects in the environment surrounding the vehicle 10. In one embodiment, the vehicle 10 can be a heavy-duty vehicle or commercial vehicle such as a vehicle used for the construction or mining industries. However, in other embodiments, the vehicle 10 can be an automobile, passenger car or other similar type of vehicle. The radar system 20 can provide information about objects in the environment to a display HMI 30 that can assist a driver or user of the vehicle 10 in maneuvering the vehicle 10 in the environment.

As shown in FIG. 1, the radar system 20 can be used to assist the driver or operator of the vehicle 10 when the vehicle 10 in moving in a reverse or backwards direction. The radar system 20 can include a single radar sensor 40 (see FIG. 2) located at the rear of the vehicle 10 in the approximate center of the vehicle 10. The radar sensor 40 can emit electromagnetic waves (e.g., radio waves) 35 that can be used to detect objects (e.g., a person 50) that are near or in the vicinity of the rear of the vehicle 10. In other embodiments, the radar sensor 40 can be placed at other locations on the vehicle 10 such as the front, side or corner of the vehicle 10 to assist the driver when the vehicle 10 is moving in any direction. In still another embodiment, the radar system 20 can incorporate multiple radar sensors 40 positioned at different locations of the vehicle 10 (e.g., front, sides, corners and rear of the vehicle) to assist the driver when the vehicle 10 is moving in any direction.

The radar system 20 can then analyze the information from the radar sensor(s) 40 about any detected objects 50 and provide the driver with information about the detected objects 50 on the display HMI (human-machine interface) 30. The information provided to the driver on the display HMI 30 can then be used by the driver to determine the presence and approximate location of the objects 50 relative to the vehicle 10 in order to avoid collisions with the objects 50.

Figure 2:
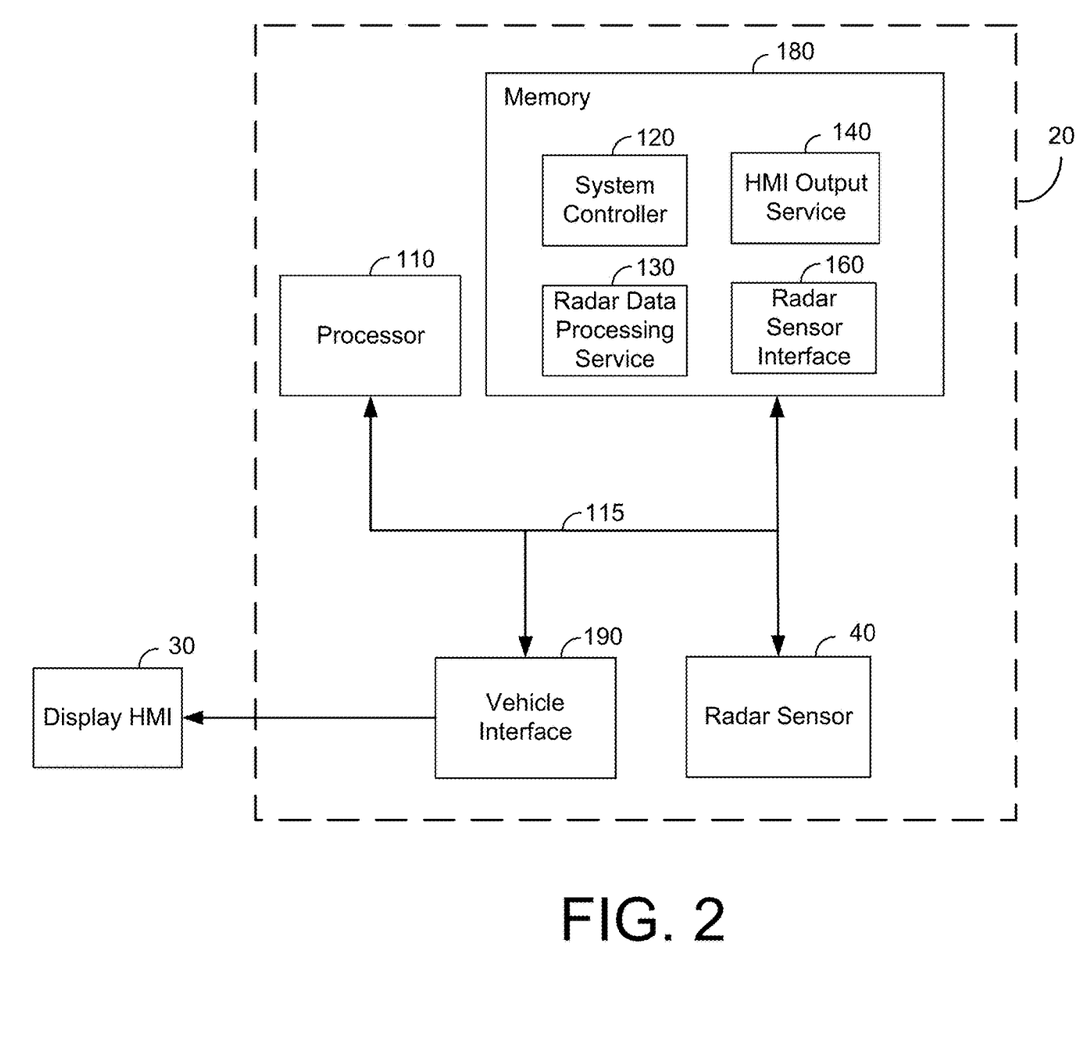
FIG. 2 is a block diagram showing an embodiment of the radar system from FIG. 1.

FIG. 2 shows an embodiment of the radar system 20. The radar system 20 can include logic 120, referred to herein as "the system controller," for generally controlling the operation of the radar system 20. The radar system 20 also includes logic 130, referred to herein as "the radar data processing service," logic 140, referred to herein as "the HMI output service," and logic 160, referred to herein as "the radar sensor interface." The radar data processing service 130 can be used to infer information about the environment (or a corresponding 2D or 3D vector space) based on information received from the radar sensor 40 (via the radar sensor interface 160). The HMI output service 140 can be used to process the information from the radar data processing service 130 for display on the display HMI 30. The radar sensor interface 160 can be used to control the operation of the radar sensor 40 and/or manage the data received from the radar sensor 40. In other embodiments, the radar data processing service 130, the HMI output service 140, and/or the radar sensor interface 160 can be combined with the system controller 120 or with one another. The system controller 120, the radar data processing service 130, the HMI output service 140, and the radar sensor interface 160 may be implemented in software, firmware, hardware, or any combination thereof. In FIG. 2, the system controller 120, the radar data processing service 130, the HMI output service 140, and the radar sensor interface 160 are implemented in software and stored in memory 180. However, other configurations of the system controller 120, the radar data processing service 130, the HMI output service 140, and the radar sensor interface 160 are possible in other embodiments.

Note that the system controller 120, the radar data processing service 130, the HMI output service 140, and the radar sensor interface 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The radar system 20 may include at least one conventional processor 110, which includes processing hardware for executing instructions stored in the memory 180. As an example, the processor 110 may include a central processing unit (CPU) or a digital signal processor (DSP). The processor 110 communicates with and drives the other elements within the radar system 20 via a local interface 115, which can include at least one bus. When the system controller 120, the radar data processing service 130, the HMI output service 140 and the radar sensor interface 160 are implemented in software, the processor 110 may execute instructions of the system controller 120, the radar data processing service 130, the HMI output service 140 and the radar sensor interface 160 to perform the functions ascribed herein to the corresponding components.

In addition, the radar system 20 can include a vehicle interface 190 (e.g., data ports) for connecting the radar system 20 to the display HMI 30 that permits the radar system 20 to provide information directly to a user of the vehicle via the display HMI 30. In one embodiment, the radar system 20 can be connected to the display HMI 30 by a controller area network (CAN), but other types of connections may be used in other embodiments. In an embodiment, the system controller 120 of the radar system 20 can be used to manage process execution in the radar system 20 and control operation of the radar system 20 and the corresponding components of the radar system 20. The system controller 120 can communicate with (i.e., send and receive information, data, messages, commands, etc.) with the radar data processing service 130, the HMI output service 140 and the radar sensor interface 160. The radar sensor interface 160 can facilitate control of the operation of the radar sensor 40 by the system controller 120 and the processing of the data from the radar sensor 40 by the radar data processing service 130 by enabling communication between the radar sensor 40 and the system controller 120, the radar data processing service 130 or other components of the radar system 20.

Figure 3:
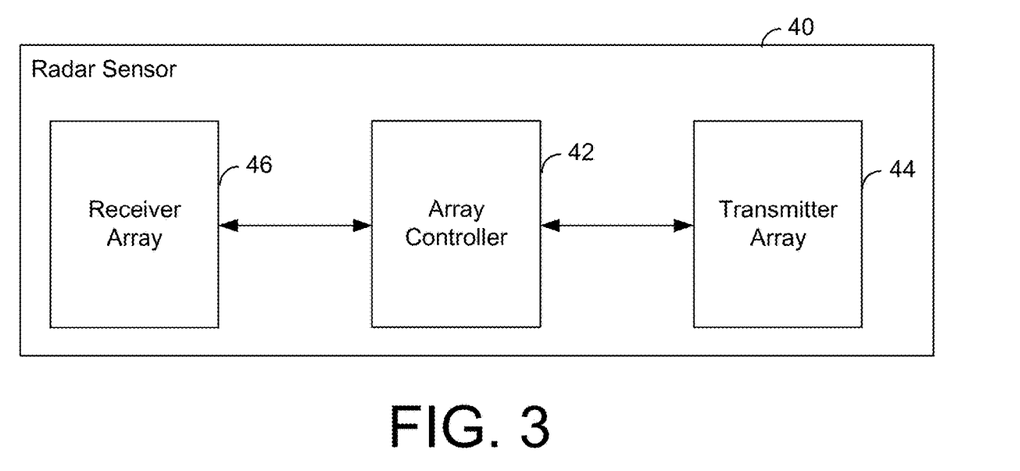
FIG. 3 is a block diagram showing an embodiment of the radar sensor from the radar system of FIG. 2.

FIG. 3 is a block diagram showing an embodiment of the radar sensor 40. The radar sensor 40 can include a multiple-input multiple-output (MIMO) radar array in one embodiment. The MIMO radar array of the radar sensor 40 can include a radar array controller 42 connected to a transmitter array 44 and a receiver array 46. The transmitter array 44 of the radar sensor 40 can emit electromagnetic waves (e.g., radio waves) via a microstrip patch antenna array in a time-division multiplexing (TDM) mode and the receiver array 46 can receive reflected electromagnetic waves via a microstrip patch antenna array upon the emitted electromagnetic waves being reflected off an object. In an embodiment, the transmitter array 44 of the MIMO radar array can emit frequency modulated continuous wave (FMCW) waveforms within a 77 GHZ-81 GHz frequency range, based on signals received from the array controller 42. The waveforms emitted by the transmitter array 44 of the MIMO radar array result in a corresponding scan zone for the radar sensor 40 and can be based on the waveform and emission parameters associated with the transmitter array 44. Further, it is to be understood that the radar sensor 40 may include additional components (not specifically shown) to process signals associated with the transmission and reception of the electromagnetic waves.

In an embodiment, the transmitter array 44 can include two or more transmitters and corresponding antennas and the receiver array 46 can include two or more receivers and corresponding antennas. The transmitters and the receivers (and their corresponding antennas) can be arranged to form a MIMO virtual antenna array, with the transmitters and receivers arranged along the same axis. In another embodiment, the transmitters and the receivers may be arranged along orthogonal axes.

The radar sensor 40 is generally arranged for ground-to-ground radar applications (i.e., the vehicle 10 is located on the ground and the radar system 20 is being used to detect objects that are also located on the ground). For example, the radar sensor 40 can be arranged to emit waveforms associated with short-range radar (SRR) that can be used to detect objects in the environment up to about 30 meters from the vehicle 10. The radar sensor 40 can have a substantially fixed position on the vehicle 10 and emit waveforms corresponding to the desired range and radial velocity parameters to be obtained. In other words, the waveforms can be controlled based on the desired maximum detectable range, the desired range resolution, the desired maximum detectable velocity and the desired velocity resolution.

In an embodiment, the transmitter array 44 of the MIMO radar array, based on instructions from the array controller 42, can operate sequentially in a TDM mode (e.g., one transmitter sends a signal, followed by the next transmitter sending a signal and so on) constituting one transmit cycle. The receiver array 46 of the MIMO radar array can receive the return signals in parallel for each transmitter signal and can provide the return signals to the array controller 42. The array controller 42 can then form a frame of data that includes data relating to the return signals from 64 transmit cycles and transmit the frames of data to the radar data processing service 130 via the radar sensor interface 160. The radar data processing service 130 can then process the frame data into one or more higher-level data products (e.g., a track or object) as discussed in more detail below.

Figure 4:
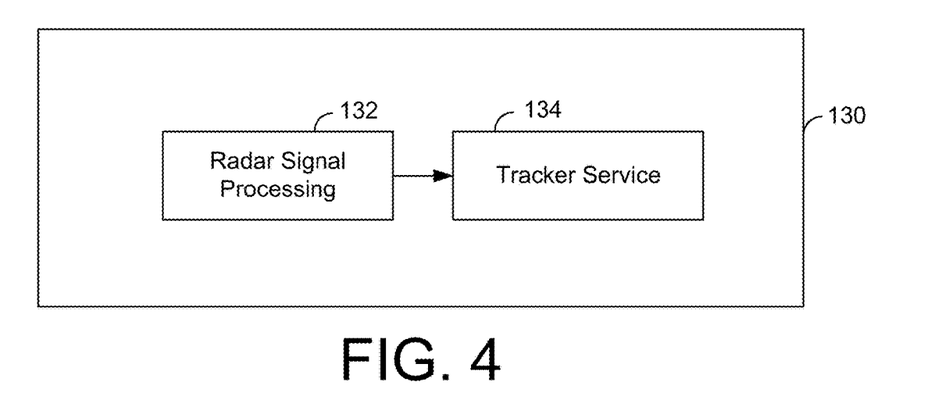
FIG. 4 is a block diagram showing an embodiment of the radar data processing service from the radar system of FIG. 2.

FIG. 4 is a block diagram showing an embodiment of the radar data processing service 130. The radar data processing service 130 can take raw data (e.g., a frame of data) from the radar sensor 40 and detect and track one or more objects (if present) in the environment (or the 2D or 3D vector space) from the raw data. For example, the radar data processing service 130 can make determinations regarding the detected object, viz. is the object moving or are multiple objects present, etc. The radar data processing service 130 can detect and track the objects using parameters corresponding to a world view of the environment (e.g., an object behind the vehicle at a particular location with a particular certainty). The parameter for an object can include descriptive statistics such as a kinematic state (e.g., position, velocity (relative and/or grounded) and acceleration) for the object.

The radar data processing service 130 can include a radar signal processing module 132 and a tracker service 134. As the radar data processing service 130 receives the frame data from the radar sensor 40, the radar signal processing module 132 can process the frame data and generate a point cloud for the frame that is provided to the tracker service 134. In one embodiment, the radar signal processing module 132 can perform Fast Fourier Transforms (FFTs) on the data to generate information such as the range, Doppler (or velocity) of the return signals followed by separating objects in the scene (detections) from unwanted noise/clutter using CFAR (constant false alarm rate). The radar signal processing module 132 then estimates the angle-of-arrival of the list of detections and subsequently can use the information on the detections to generate a point cloud that provides information about the environment in the entire field of view of the radar sensor 40. The point cloud is then provided to the tracker service 134 to monitor the objects of interest in the scene (of the environment).

Figure 5:
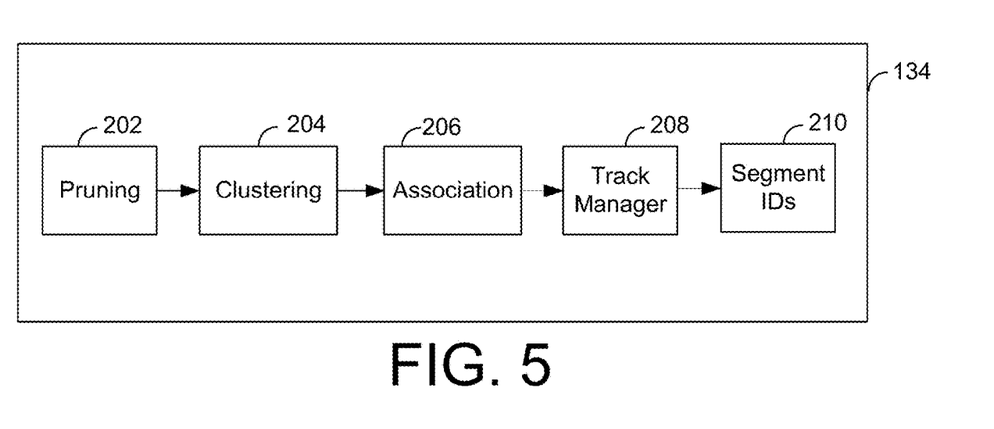
FIG. 5 is a block diagram showing an embodiment of the tracker service from the radar system of FIG. 4.

FIG. 5 is a block diagram of an embodiment of the tracker service 134. The tracker service 134 can include a pruning module 202, a clustering module 204, an association module 206, a track manager 208 and a segment identification (ID) module 210. The pruning module 202 can be used to be used to remove artifacts from the point cloud that i) have non-zero Doppler information but do not change position; ii) correspond to unwanted reflections from the ground; and iii) correspond to static reflections from the parts of the vehicle (usually defined as the "offset area"). After the pruning process, the point cloud is then provided to the clustering module 204 to determine and group detections in the point cloud that correspond to the same objects in the scene. The association module 206 can evaluate the detected objects from the clustering module 204 and determine if the detected object has been in a prior frame and can be considered a track. The information about the tracks from the association module 206 can then be provided to the track manager 208. The track manager 208 analyzes information about all of the detected tracks from the association module 206. Once a track is determined to be an "active" track by the track manager 208, the track manager 208 provides the information on the "active" tracks to segment ID module 210 that provides an identifier for the "active" track. The segment ID module 210 can then provide the identifiers and corresponding information on the active tracks to the HMI output service 140 for further processing and display on the display HMI 30 to the user at 10 Hz. In another embodiment, the display rate can be higher or lower than 10 Hz.

The HMI output service 140 can receive the information on the active tracks from the tracker service 134 and display the information on the active tracks to the driver or operator of the vehicle 10 in a manner defined by the user. The HMI output service 140 permits the user to define the specific region of the scene of the environment that is of interest to the user (i.e., the user-defined region (UDR)) for the driver or operator of the vehicle 10. In addition, the HMI output service 140 also permits the user to define how the UDR is displayed on the display HMI 30 to an operator of the vehicle 10.

Figure 6:
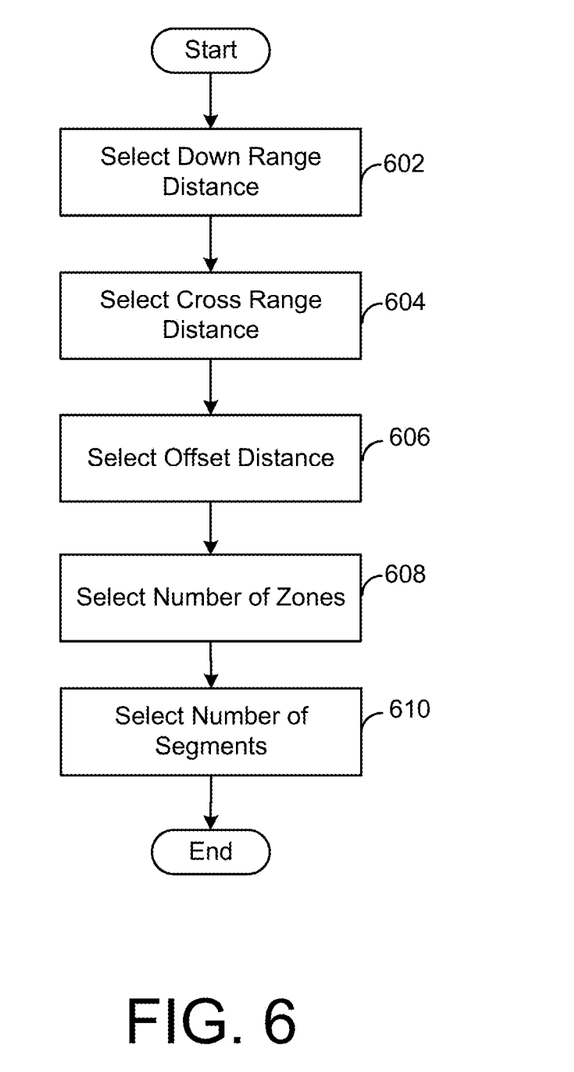
FIG. 6 is a flowchart showing an embodiment of a process for a user to define a region of interest in the environment.
Figure 8:
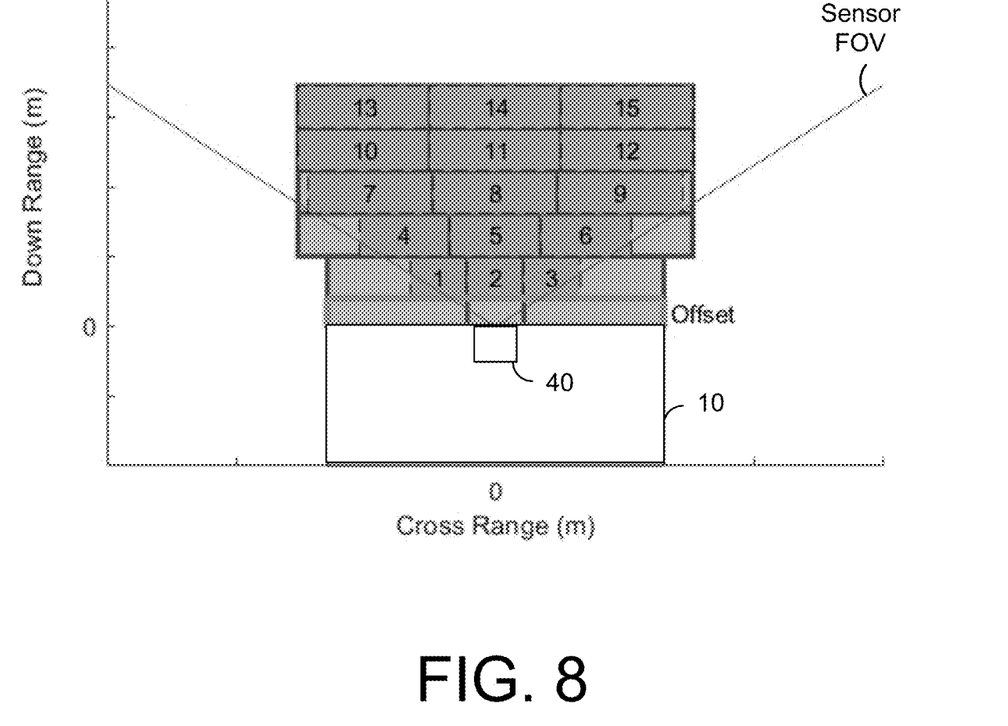
FIG. 8 is a schematic diagram showing an embodiment of a user defined region relative to a radar sensor for a vehicle.

FIG. 6 is directed to an embodiment of a process for a user to define a region of interest in the environment. The process begins with the user selecting the down range distance of interest for the UDR (step 602). The down range distance is the distance from the sensor 40 away from the vehicle 10 (e.g., along the y-axis) as shown in FIG. 8. The user can select the desired down range distance for viewing up to the maximum range of the sensor 40 (e.g., 30 meters). The user can then select the cross range distance of interest for the UDR (step 604). The cross range distance is the lateral distance from the sensor 40, on each side of the sensor, (e.g., along the x-axis) as shown in FIG. 8. The user can select a desired cross range distance for viewing that can correspond to the width of the vehicle 10.

Next, the user can select an offset distance to be used with the UDR (step 606). The offset distance can be used to remove areas of the environment from the UDR that are in the field of view of the sensor 40 but may not be of interest to the driver or operator of the vehicle 10. For example, depending on the positioning of the sensor 40 on the vehicle 10, structural items of the vehicle 10 may be detected by the sensor 40 but not be of interest to the user because the detection is part of the vehicle 10 and not an object of concern. The offset distance can be used to remove static detections from display in the UDR. Once the general area for the UDR is selected, then the user can begin to configure how the UDR will be displayed to the driver or operator of the vehicle 10. The user can define the number of zones (e.g., 1 or more) that are displayed to the driver or operator of the vehicle 10 (step 608). Each zone can represent a particular range of down range distances relative to the vehicle. In the embodiment of FIG. 8, five zones have been selected by the user, but other numbers of zones can be used in other embodiments. The user can also define the number of segments (e.g., 1 or more) that are displayed to the driver or operator of the vehicle 10 (step 610). Each segment can represent a particular range of cross range distances relative to the vehicle. In the embodiment of FIG. 8, three segments have been selected by the user, but other numbers of segments can be used in other embodiments.

Figure 7:
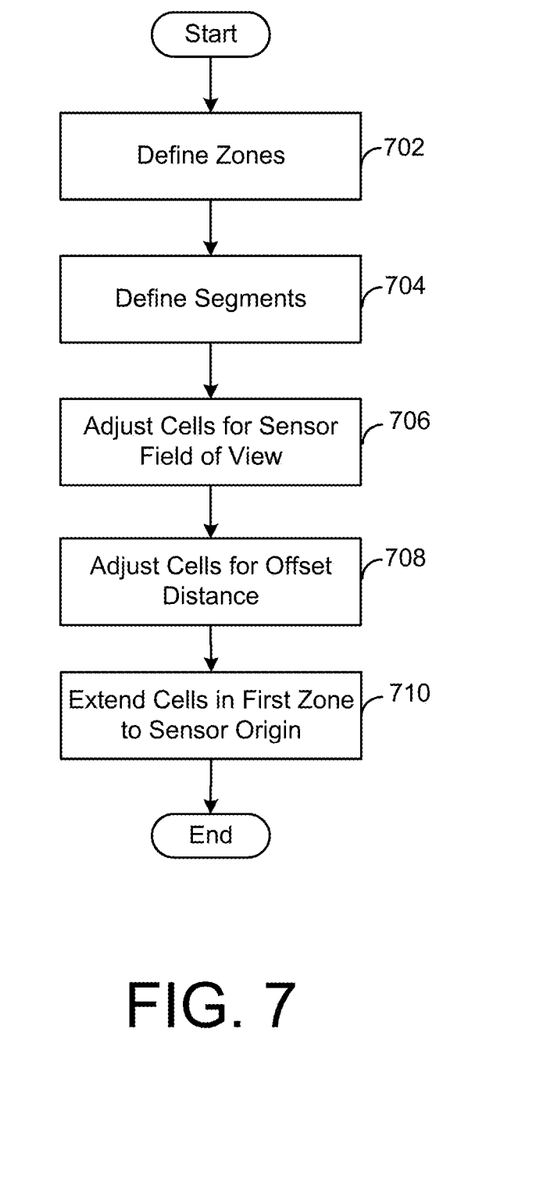
FIG. 7 is a flowchart showing an embodiment of a process for configuring the user defined region of interest for display to the driver or operator of the vehicle

FIG. 7 is directed to an embodiment of a process for configuring the user defined region for display to the driver or operator of the vehicle 10. The process begins by defining the zones selected by the user (step 702). In an embodiment, the distance range for each zone can correspond to the selected down range distance divided by the selected number of zones. For example, if the user selected a down range distance 10 meters and 5 zones, then each zone would have a corresponding down range depth of 2 meters. The process then defines the segments selected by the user (step 704). In an embodiment, the distance range for each segment can correspond to the selected cross range distance divided by the selected number of segments. For example, if the user selected a cross range distance 6 meters and 3 segments, then each segment would have a corresponding cross range width of 2 meters. In another embodiment, the distance ranges for the individual zones and segments may be unequal (e.g., one zone may have a larger distance range than another zone), as defined by the user. The defining of the zones and segments results in the UDR being divided into a number of cells, which equals the number of zones times the number of segments. In the embodiment of FIG. 8, fifteen cells (numbered 1-15) have been defined.

After the cells have been defined based on the number of zones and segments, the cells are adjusted to account for the field of view of the sensor 40 such that all of the cells in the UDR are within the field of view of the sensor 40. As can be seen in the embodiment of FIG. 8, cells 10-15 are dimensioned to a full-size segment. However, the segments in the zones closer to the sensor, cells 1-9, have a segment width less than a full-size segment due to the field of view of the sensor 40. The visual field of view of the sensor 40 can be a cone, which corresponds to the sensor's emitting pattern, and the portions of the field of view closer to the sensor are smaller thus limiting the size of the closer segments (and corresponding cells). After the cells have been adjusted for the field of view of the sensor 40, the cells of the UDR can be adjusted to account for any offset distance selected by the user (step 708). In an embodiment, the cells of the UDR can be shifted away from the vehicle 10 by a distance corresponding to the offset distance as shown in FIG. 8. In addition, after adjusting for the offset distance, the cells may be readjusted for the field of view as needed. Finally, the cells in the first zone can be expanded (step 710) to account for areas outside of the cells (e.g., the offset area and/or the area outside of the field of view). In another embodiment, the cells can continue to all be the same size irrespective of the sensor field-of-view.

Figure 9:
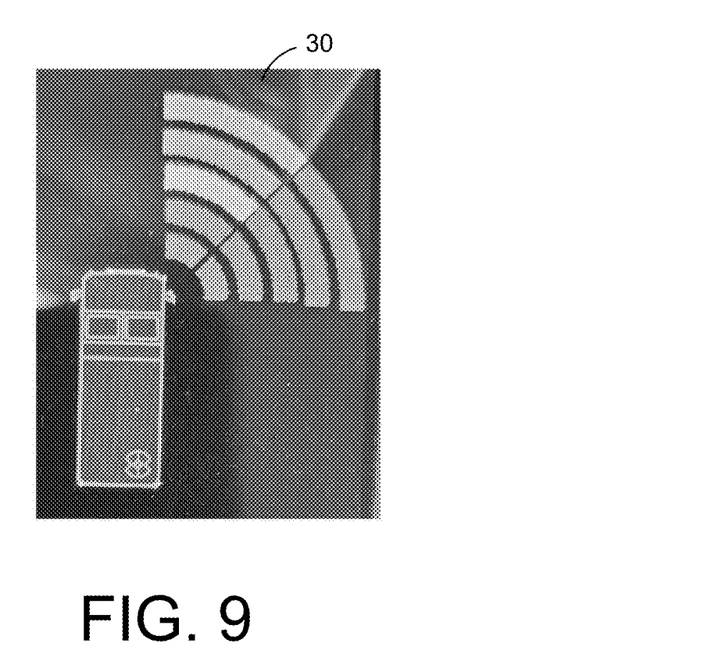
FIGS. 9 and 10 are embodiments of a display provided to the driver or operator of the vehicle on the display HMI of FIG. 2.
Figure 10:
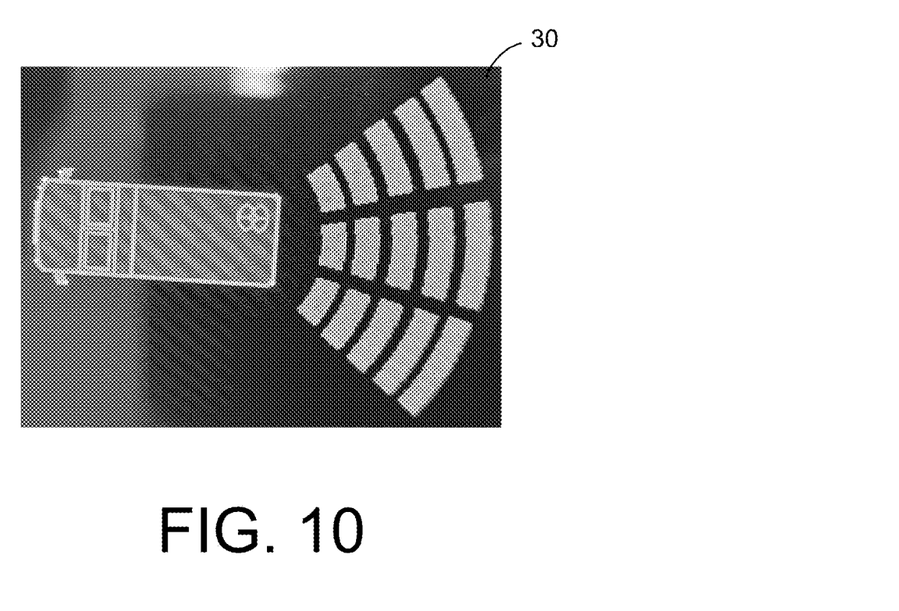

As the HMI output service 140 receives information on active tracks from the radar data processing service 130, the HMI output service 140 can correlate or correspond the locations of the active tracks to cells in the UDR. If an active track is located in a cell of the UDR, the HMI output service 140 can display the information about the detected track on the display HMI 30. The displayed information can include a display of the UDR with the selected zones and segments of the UDR defining the cells of the displayed UDR. The HMI output service 140 can illuminate the cell of the UDR displayed on the display HMI to indicate that an object or active track is in that corresponding location of the UDR. FIGS. 9 and 10 show embodiments of a display to the driver or operator of the vehicle 10 on the display HMI 30. The HMI output service 140 configures the display on the display HMI to the location of the sensor 40 relative to the vehicle and the selected zones and segments of the UDR. As shown in FIG. 9, the display HMI 30 shows a UDR for a sensor located at the front right corner of the vehicle with 5 zones and 2 segments. As shown in FIG. 10, the display HMI 30 shows a UDR for a sensor located at the rear center of the vehicle with 5 zones and 3 segments.

In an embodiment, the HMI output service 140 can evaluate the information from the segment ID module 210 to determine when to display information about the track to the driver or operator of the vehicle 10. The HMI output service 140 can determine the age of each track (i.e., the number of consecutive frames that include the track) and determine if the age exceeds a predetermined threshold (e.g., present in 5 consecutive frames) and has a reliability score (i.e., a score that indicates the confidence that the detection is an object) greater than a predetermined threshold (e.g., 60%). Once the age and reliability for a track satisfy the predefined criteria, the cell of the UDR that contains the track can be illuminated or indicated to the user (i.e., the cell of the UDR that corresponds to the location of the track). After the track has been indicated to the user on the UDR, the track can still be indicated to the user even if the reliability score goes below the predetermined threshold (i.e., the track becomes "invisible"). Once the track is below the predetermined threshold (or invisible) for a predetermined number of times (or frames), the track is then no longer indicated to the driver or operator of the vehicle 10. In other embodiments, the HMI output service 140 may provide the driver or operator of the vehicle 10 with other indications (e.g., an audible notification or a haptic notification) regarding the detection of an object.

The HMI output service 140 may also include a smoothing algorithm to limit "flickering" or jitter between cells of the UDR. Flickering can occur when an active track is located on the border(s) between cells and bounces between the cells in which the active track is located. The smoothing algorithm of the HMI output service 140 can permit a track to switch cells immediately if the track is determined to be in a different cell. However, the track can't return to the prior cell unless predefined conditions are satisfied. Some of the predefined conditions can relate to requiring the track to remain in the new cell for a predefined number of frames.

The HMI output service 140 can also track information about the tracks received from the segment ID module 210. The HMI output service 140 can include information about the location of the track (e.g., x and y coordinates), the age of the track and the reliability score of the track. In addition, once the track is displayed to the user, the HMI output service 140 can also log the corresponding cell of the UDR that includes the track and the previous cell where the track was located. The smoothing algorithm can use the logged information about the location of the tracks to reduce flickering or jitter on the display HMI 30. The first time a track is displayed, the HMI output service 140 sets the current cell location and the previous cell location to the cell that the track is located in. On subsequent displays of the track in the same cell, the current cell indication stays the same, but the age of previous cell is increased. Upon the track being determined to have moved to a new corresponding cell, the current cell of the track is changed to the new cell unless the new cell is the same as the previous cell and the age of the previous cell location is less than a predetermined threshold (e.g., the number of frames before switching cells). If the track does not change cells (e.g., the age is less than the predetermined threshold), the current and previous cell indications do not change but the age of the previous cell is increased. If the track does change cells, the new cell becomes the current cell and the prior cell becomes the previous cell and the age counter is reset.

In an embodiment, the HMI output service 140 illuminates a cell once a track has been correlated to that cell. If multiple tracks are correlated to the same cell, the cell is still illuminated but the individual tracks are monitored separately. The separating monitoring of the tracks permits the HMI output service 140 to illuminate or indicate multiple cells of the UDR as the individual tracks move out of the common cell and into different cells, thereby allowing the driver or operator of the vehicle 10 to know the location of multiple objects in the environment.

In one embodiment, the HMI output service 140 can illuminate the cell that includes the active track and the cells behind the one with the active track (i.e., cells away from the vehicle) that are in the same segment. In another embodiment, the HMI output service 140 may only illuminate the cell with the active track. The HMI output service 140 may also illuminate cells with different colors depending on the zone in which the cell is located. For example, cells in the first zone (e.g., cells 1-3 from FIG. 8) may be illuminated with red, while cells in the fifth zone (e.g., cells 13-15 from FIG. 8) may be illuminated with yellow. In another embodiment, the HMI output service 140 may also illuminate cells with any other colors.

In an embodiment, while the HMI output service 140 only considers tracks that correspond to cells of the UDR, the HMI output service 140 can monitor tracks that are outside of the UDR and then display them to the driver or operator of the vehicle 10 once the monitored track enters the UDR. In other words, the HMI output service 140 can actively monitor tracks within the radar field of view, even if the tracks are outside of the UDR. By monitoring the active tracks, the HMI output service 140 can then report on the active tracks that enter the UDR almost immediately or instantaneously without having to satisfy the age requirement to display the track. In addition, an extrapolated location of a moving track with the UDR can be reported for predefined number of frames (e.g., 5) even if the object exits the radar field of view (e.g., becomes "invisible").

In an embodiment, the offset distance can be set by the user to exclude the down range area that may include the vehicle's structure when the radar sensor 40 is mounted on the vehicle 10. The pruning module 202 can then treat detections with a zero Doppler in the offset area (i.e., the area between the sensor and the offset first zone) as being detections or targets that are attached to the vehicle and remove them. If the detection or target in the offset area has a non-zero Doppler, the pruning module 202 passes the detection to the clustering module 204 for further processing. If the detected target in the offset area and is determined to be an active track, the track can be included in the expanded cells of the first zone and displayed to the user as being in a cell of the first zone (even though the track is located in the offset area).

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method of displaying objects detected by a vehicular radar system to an operator of a vehicle, the method comprising:
providing a single radar sensor mounted on a vehicle, the radar sensor configured to detect one or more objects in an environment surrounding the vehicle with electromagnetic radiation;
defining, based on a selection of a down-range distance of interest for the radar sensor and a cross-range distance of interest for the radar sensor by a user, a region of interest relative to the environment and to the vehicle, wherein the defined region includes a plurality of cells having predefined boundaries relative to the environment and to the vehicle;
receiving return signals by the radar sensor in response to an emission of electromagnetic radiation by the radar sensor;
analyzing, with a processing algorithm, the return signals received by the radar sensor;
identifying one or more objects in the environment surrounding the vehicle from the analysis of the return signals;
determining if a location of the one or more identified objects corresponds to a cell of the plurality of cells in the defined region of interest;
displaying, on a display visible to an operator of the vehicle, the defined region of interest with the plurality of cells; and
indicating, on the displayed region of interest, one or more cells corresponding to an identified object based on the determining.

2. The method of claim 1, wherein defining the region of interest further includes:
selecting a number of zones in the defined region of interest, wherein each zone corresponds to a down-range portion of the region of interest; and
selecting a number of segments in the defined region of interest, wherein each segment corresponds to a cross-range portion of the region of interest and the plurality of cells corresponds to the number of zones multiplied by the number of segments.

3. The method of claim 2, further comprising:
defining a field of view for the radar sensor; and
adjusting a size of one or more cells of the plurality of cells based on the determined field of view.

4. The method of claim 1, wherein defining the region of interest further includes defining an offset area, wherein the offset area is located adjacent to the radar sensor mounted on the vehicle.

5. The method of claim 4, further comprising:
determining whether a location of the one or more identified objects corresponds to the offset area;
the identifying the one or more objects in the environment includes determining a relative velocity for each object;

determining whether one or more identified objects located in the offset area has a non-zero relative velocity; and the determining whether a location of the one or more identified objects corresponds to a cell of the plurality of cells includes assigning an object in the offset area with a non-zero relative velocity to a cell of the plurality of cells.

6. The method of claim 1, wherein displaying the defined region of interest with the plurality of cells includes corresponding the displayed region to the location of the radar sensor on the vehicle.

7. The method of claim 1, wherein:
the identifying one or more objects in the environment includes determining an age for each identified object, wherein the age of each identified object corresponds to a number of consecutive frames of the environment that includes the identified object; and
the indicating, on the displayed region of interest, one or more cells corresponding to an identified object includes indicating one or more cells corresponding to the identified object based on the age of the identified object being greater than a predetermined value.

8. The method of claim 1, wherein:
the determining whether a location of the one or more identified objects corresponds to a cell of the plurality of cells in the defined region of interest includes determining whether an object has moved from a first cell to a second cell in the defined region of interest;
the indicating, on the displayed region of interest, one or more cells corresponding to an identified object includes indicating the identified object in the second cell on the displayed region of interest;
the determining whether a location of the one or more identified objects corresponds to a cell of the plurality of cells in the defined region of interest further includes determining whether the object has moved back from the second cell to the first cell in the defined region of interest; and
the indicating, on the displayed region of interest, one or more cells corresponding to an identified object further includes preventing the identified object from being indicated in the first cell for a predetermined period.

9. The method of claim 1, further comprising monitoring a location of an identified object upon the determination that the identified object is outside the region of interest, wherein monitoring the location of the identified object includes determining an age for the identified object.

10. The method of claim 9, wherein:
the determining whether a location of the one or more identified objects corresponds to a cell of the plurality of cells includes determining whether the identified object outside the region of interest has moved inside the defined region of interest; and
the indicating, on the displayed region of interest, one or more cells corresponding to an identified object includes immediately indicating one or more cells corresponding to the identified object upon the age of the identified object being greater than a predetermined value.

11. A radar system for a vehicle comprising:
a single radar sensor mounted on a vehicle, the radar sensor configured to detect one or more objects in an environment surrounding the vehicle with electromagnetic radiation;
a display visible by an operator of the vehicle;
a control system connected to the display, the control system comprising:
a processor;
a memory device storing control logic,
the control logic comprising instructions that, when executed by the processor, cause the processor to:
permit a user to define a region of interest relative to the environment and to the vehicle based on a selection of a down-range distance of interest for the radar sensor and a cross-range distance of interest for the radar sensor, wherein the defined region includes a plurality of cells having predefined boundaries relative to the environment and to the vehicle;
receive return signals from the radar sensor in response to an emission of electromagnetic radiation by the radar sensor;
analyze the return signals to identify one or more objects in the environment surrounding the vehicle;
determine if a location of the one or more identified objects corresponds to a cell of the plurality of cells in the defined region of interest;
display the defined region of interest with the plurality of cells on the display; and
indicate, on the displayed region of interest, one or more cells corresponding to an identified object in that cell.

12. The radar system of claim 11, wherein the logic further comprises instructions that, when executed by the processor, cause the processor to:
permit a user to define a number of zones in the defined region of interest, wherein each zone corresponds to a down-range portion of the region of interest; and
permit a user to define a number of segments in the defined region of interest, wherein each segment corresponds to a cross-range portion of the region of interest and the plurality of cells corresponds to the number of zones multiplied by the number of segments.

13. The radar system of claim 11, wherein the logic further comprises instructions that, when executed by the processor, cause the processor to:
determine a field of view for the radar sensor; and
adjust a size of one or more cells of the plurality of cells based on the determined field of view.

14. The radar system of claim 11, wherein the logic further comprises instructions that, when executed by the processor, cause the processor to permit a user to define an offset area, wherein the offset area is located adjacent to the radar sensor mounted on the vehicle.

15. The radar system of claim 14, wherein the logic further comprises instructions that, when executed by the processor, cause the processor to:
determine if a location of the one or more identified objects corresponds to the offset area;
determine a relative velocity for each object;
determine if the one or more identified objects located in the offset area has a non-zero relative velocity; and
assign the one or more identified objects in the offset area with a non-zero relative velocity to a cell of the plurality of cells.

16. The radar system of claim 11, wherein the logic further comprises instructions that, when executed by the processor, cause the processor to display a portion of the vehicle and the region of interest corresponding to the location of the radar sensor on the vehicle.

17. The radar system of claim 11, wherein the logic further comprises instructions that, when executed by the processor, cause the processor to:

determine an age for each identified object, wherein the age of each identified object corresponds to a number of consecutive frames of the environment that includes the identified object; and indicate the one or more cells corresponding to an identified object on the display based on the age of an identified object being greater than a predetermined value.

18. The radar system of claim 11, wherein the logic further comprises instructions that, when executed by the processor, cause the processor to:

determine whether an object has moved from a first cell to a second cell in the defined region of interest;

indicate the identified object in the second cell on the displayed region of interest;

determine whether the object has subsequently moved back from the second cell to the first cell in the defined region of interest; and prevent the identified object from being indicated in the first cell for a predetermined period.

19. The radar system of claim 11, wherein the logic further comprises instructions that, when executed by the processor, cause the processor to:

monitor a location of an identified object upon the determination that the identified object is outside the region of interest; and determine an age for the identified object.

20. The radar system of claim 19, wherein the logic further comprises instructions that, when executed by the processor, cause the processor to:

determine whether the identified object outside the region of interest has moved inside the defined region of interest; and immediately indicate the identified object on the displayed region of interest upon the age of the identified object being greater than a predetermined value.

* * * * *